(12) United States Patent
Yeo et al.

(10) Patent No.: US 9,870,276 B2
(45) Date of Patent: Jan. 16, 2018

(54) USER MESSAGE QUEUE METHOD FOR INTER-PROCESS COMMUNICATION

(71) Applicant: CONTINENTAL AUTOMOTIVE GMBH, Hanover (DE)

(72) Inventors: Kee Joo Yeo, Singapore (SG); Jim Seng Tie, Singapore (SG); Trung Thang Le, Singapore (SG)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/025,069

(22) PCT Filed: Sep. 26, 2013

(86) PCT No.: PCT/IB2013/058877
§ 371 (c)(1),
(2) Date: Mar. 25, 2016

(87) PCT Pub. No.: WO2015/044713
PCT Pub. Date: Apr. 2, 2015

(65) Prior Publication Data
US 2016/0232045 A1 Aug. 11, 2016

(51) Int. Cl.
*G06F 9/54* (2006.01)
(52) U.S. Cl.
CPC ........ *G06F 9/546* (2013.01); *G06F 2209/548* (2013.01)
(58) Field of Classification Search
None
See application file for complete search history.

(56) References Cited

U.S. PATENT DOCUMENTS

| 5,644,719 | A | 7/1997 | Aridas et al. |
| 6,519,686 | B2 | 2/2003 | Woodring et al. |
| 2002/0087704 | A1 | 7/2002 | Chesnais et al. |
| 2003/0099337 | A1 | 5/2003 | Lord |
| 2003/0126229 | A1 | 7/2003 | Kantor et al. |
| 2005/0245272 | A1* | 11/2005 | Spaur .................. H04L 12/4625 455/456.3 |
| 2009/0172181 | A1* | 7/2009 | Cheng ................. H04L 41/5054 709/231 |
| 2010/0265858 | A1* | 10/2010 | Gallner ............... H04L 12/4616 370/310 |

(Continued)

*Primary Examiner* — Syed Roni
(74) *Attorney, Agent, or Firm* — Cozen O'Connor

(57) ABSTRACT

A computing device for a network of computer controlled devices that communicate with each other using a pre-determined protocol includes a computing module for sending a data message with a pre-determined message feature and a message queue module. The message queue module includes a message forwarding module and a message listening module. The message forwarding module receives data messages from its computing module and forwards the data messages to another computer controlled device of the same network. The message listening module receives data messages from another computer controlled device of the same network, checks for a match of the message features of the data messages with a pre-determined message interest feature, and if there is a match between the message feature and the pre-determined message interest feature, forwards the respective data message to the computing module.

3 Claims, 12 Drawing Sheets

(56) References Cited

U.S. PATENT DOCUMENTS

| | | | |
|---|---|---|---|
| 2010/0292867 A1* | 11/2010 | Bohm | B60W 50/06 |
| | | | 701/1 |
| 2011/0149982 A1* | 6/2011 | Hwang | H04L 12/4625 |
| | | | 370/401 |
| 2011/0276640 A1 | 11/2011 | Jesse et al. | |
| 2012/0324160 A1 | 12/2012 | Liu et al. | |
| 2013/0007288 A1* | 1/2013 | Olsen | H04L 65/1069 |
| | | | 709/227 |

* cited by examiner

USER MESSAGE QUEUE METHOD FOR INTER-PROCESS COMMUNICATION

CROSS-REFERENCE TO RELATED APPLICATIONS

This is a U.S. national stage of application No. PCT/IB2013/058877, filed on 26 Sep. 2013, the content of which is incorporated herein by reference in its entirety.

BACKGROUND OF THE INVENTION

1. Field of the Invention

The application relates to a method for computer Inter-Process Communication (IPC).

2. Related Art

A computer system has different computers and a communication network that connects the different computers to each other. Each computer has one or more data processors, wherein the data processors perform instructions of computer programs.

A computing process is an instance of a computer program. The computing process has one or more process threads, wherein the process threads perform different instructions of the computer program concurrently.

Different methods of communication among the process threads or among the computer processes are possible. These methods are referred to as Inter-Process Communication. The methods enable exchange of data among the multiple processing threads of one or more computing processes.

These methods include saving data into files, into socket connections, and into shared memory segments. Different methods provide different data bandwidths and different data latencies for different types of the data being exchanged among the process threads or processes. Selection and optimization of the methods are often an important part of the design and the development of the computer system.

SUMMARY OF THE INVENTION

According to one aspect of the present invention, a method is provided for running a communication network of computer controlled devices.

The devices have data processors with memory units. The devices are connected by a wired or wireless communicative structure, which allow the devices to communicate with each other. In other words, the devices can send data messages or information to each other.

The devices communicate with each other using a pre-determined protocol, such as the Media Oriented Systems Transport (MOST) specification.

In one aspect the method comprises a step of one device generating a data message with a pre-determined message feature in a first computing module of a first computing device. The first computing module runs or executes a computing process of an application software program, which generates the said data message with the said message feature. The message feature can refer to a particular part of the data message, such as a header or a field of the data message. The message feature can also refer to a particular content of the data message.

The first computing device then sends the data message to a dispatcher device.

After this, the dispatcher device receives the data message from the first computing device and it later forwards the data message to one or more second computing devices. In essence, the dispatcher device forwards data messages from one computing device to other computing devices.

In one aspect, the second computing device later receives the data message from the dispatcher device and it afterward checks for a match of the message feature of the data message with a predetermined message interest feature. That is, the second computing device listens to the sent data message from the other computing device to check for the match. The message interest feature often refers to a feature, which is of interest to an application program of the second computing device. In particular, the application program is running on a second computing process of a second computing module of the second computing device.

If the second computing module detects a match between the message feature and the pre-determined message interest feature, a pre-determined call-back function in the second computing module is automatically invoked to forward the respective data message to the second computing module of the second computing device.

In this manner, data messages of one computing device are shared with the other computing devices.

The subject matter of the present application can be applied to a communication network of devices with processes that communicate according to the MOST specification.

The MOST specification describes the MOST protocol, which is intended for networking of multimedia and infotainment devices in the automotive industry as well as in other industry. The protocol provides an efficient and cost-effective method to transmit audio, video, data, and control information between devices. The protocol also enables simple devices to provide their content synchronously to other devices for rendering or reproducing the content with a minimum of hardware. At the same time, it also provides a unique quality of service for transmission of the said information.

Application processes are provided that communicate with each other over a dispatcher process that is adapted to communicate according to the MOST specification.

An intermediate middleware layer is established between the application processes and the dispatcher process, providing a pre-determined interface between the application processes and the dispatcher process, based on a User Message Queue concept that is applied for Inter-Process Communication (IPC).

In another aspect, the middleware layer is provided as a User Message Queue such that an application process can register itself with the User Message Queue and listen to messages with pre-determined message interest type from other application processes.

As a result, the user or programmer of the computer system does not need knowledge about the powerful but complicated MOST specification and its details. Knowledge about the predetermined communication with the User Message Queue is sufficient for establishing the IPC.

The MOST specification defines the physical and the data link layer as well as all seven layers of the International Standard Organization's Open System Interconnect (ISO/OSI) Model of data communication. Standardized interfaces simplify the MOST protocol integration in multimedia devices. For the system developer, the MOST specification provides a protocol definition. It provides the user with a standardized interface Application Programming Interface (API) to access device functionality. The communication functionality is provided by driver software known as MOST Network Services. The MOST Network Services include Basic Layer System Services (Layer 3, 4, 5) and Application Socket Services (Layer 6), They process the MOST protocol between a MOST Network Interface Controller (NIC), which is based on the physical layer, and the API (Layer 7).

A MOST network is able to manage up to 64 MOST devices in a ring configuration. Plug-&-Play functionality allows MOST devices to be easily attached and removed. The MOST network can also be set up in a virtual star network or other topologies. Safety critical applications use redundant double ring configurations. Hubs or switches are also possible. In a MOST network, one device is designated the timing master. Its role is to continuously supply the ring with MOST frames. A preamble is sent at the beginning of the frame transfer. The other devices, known as timing slaves, use the preamble for synchronization. Encoding based on synchronous transfer, allows constant post-sync for the timing slaves.

The MOST specification provides streaming, which can be synchronous streaming, as well as package data transfer or asynchronous streaming over a physical layer that can be an optical fibre. It is separated into several physical channels. The user can select and configure the channels into groups. The MOST specification provides many services and methods for the allocation and de-allocation of physical channels. The MOST specification can support uncompressed stereo audio channels with Compact Disk (CD) quality sound or up to Moving Picture Experts Group (MPEG) 1 channels for audio/video transfer. The MOST specification also provides one or more channels for transferring control information. Control messages are used to configure MOST devices and configure synchronous and asynchronous data transfer. Reference data can also be transferred via the control channel.

The MOST specification is specified to support both optical and electrical physical layers, and some Intelligent Network Interface Controllers (INICs) support electrical data transfer via Unshielded Twisted Pair (UTP).

The MOST specification can also provide a physical layer to implement the Ethernet protocol with an increased frame length and with adjustable bandwidth. The MOST specification can also provide isochronous transfer of data on the synchronous channel.

The MOST specification can further enable a multiplex network infrastructure capable of transmitting all forms of infotainment data, including video, throughout an automobile.

As a result, the user or programmer of the computer system does not need knowledge about the MOST specification and its details. Knowledge about the pre-determined communication with the User Message Queue is sufficient for establishing the IPC.

In another aspect, a method is provided for running a communication network of computer controlled devices that communicate with each other using a pre-determined protocol.

The method includes a step of generating a data message with a pre-determined message feature in a first computing module of a first computing device.

The first computing device then sends the data message to a dispatcher device.

The dispatcher device later receives the data message from the first computing device and it afterward forwards the data message to one or more second computing devices.

After this, the second computing device receives the data message from the dispatcher device and it checks for a match of the message features of the data message with a pre-determined message interest feature.

If a match between the message feature and the pre-determined message interest feature is detected, the respective data message is then forwarded to a second computing module of the at least one second computing device.

In particular, the step of generating of a data message with pre-determined message and the step of sending of the data message to the dispatcher device further comprises a step of converting the data message from a pre-determined application format to a pre-determined network protocol format.

This conversion of format allows the data message to be transmitted to the dispatcher device.

The application also provides another method for running a communication network of computer controlled devices that communicate with each other using a pre-determined protocol.

The method includes a step of generating a data message with pre-determined message feature in a first computing module of a first computing device.

The first computing device then sends the data message to a dispatcher device.

Following this, the dispatcher device receives the data message and the dispatcher device forwards the data message to one or more second computing device.

The respective second computing device then receives the data message. The second computing device later checks for a match of the message features of the data message with a predetermined message interest feature.

If there is a match between the message feature and the predetermined message interest feature, the respective data message is forwarded to a second computing module of the at least one second computing device.

The forwarding of the respective data message to a second computing module of the at least one second computing device comprises a step of converting the data message from a predetermined network protocol format to a pre-determined application format.

The pre-determined application format is suitable for use by an application program of the second computing device.

The pre-determined protocol is a MOST protocol, which is often used in automotive applications.

The method may include a step of the first and the second computing devices registering their address information with the dispatcher device. The address information allows the dispatcher device to send data messages to the respective computing devices.

A software application program of the second computing device can register its pre-determined message interest feature with the respective second computing device. The application program may require a data message with a certain feature. In other words, the program is interested in the data message with the particular feature.

In another aspect, a further method is provided for operating a message queue module of a computing module of a network of computer-controller devices.

The method has a data transfer step and a listening step.

The data transfer step comprises a step of receiving a data message with a message feature from the computing module. After this, the data message with the message feature is sent to a dispatcher module of the network for sending to at least one other computing module using a pre-determined protocol.

The listening step comprises a step of receiving a data message with a message feature from the dispatcher module using the pre-determined protocol. A match of the message feature of the data message with a predetermined message interest feature is then performed. If a match with the predetermined message interest feature is detected, the data message with the message feature that matches to its computing module.

The application also provides another method for Inter-Process Communication (IPC) in a computer system.

The network includes at least two computing devices and a dispatcher device. In particular, the computing device includes a computing module and a message queue module. The message queue module comprises a message sending module and a message listening module with a predetermined message interest feature. The dispatcher device has a dispatcher module.

The method includes a data transfer step and a listening step.

In detail, the data transfer step comprises a step of one computing module sending a data message with a message feature to its corresponding message queue module for sending the data message to the dispatcher module using a pre-determined protocol. The dispatcher module later receives the data message from the computing device and sends the data message to at least other computing device using the pre-determined protocol.

The listening step comprises a step of the message listener module receiving a data message with a message feature from the dispatcher module using the pre-determined protocol. The message listener module afterward checks for a match of the message feature of the data message with its predetermined message interest feature. If a match with its predetermined message interest feature is detected, the message listener module sends the data message with the message feature to its computing module.

In summary, these methods provide a middleware between the application program layer and the MOST protocol layers.

In another aspect, a computing device is provided for a network of computer controlled devices that communicate with each other using a pre-determined protocol.

The computing device comprises a computing module and a message queue module. The message queue module includes a message forwarding module and a message listening module.

The computing module is configured to send a data message with a pre-determined message feature.

The message forwarding module is configured to receive data messages from its computing module. It is also configured to forward the data messages to another computer controlled device of the same network.

The message listening module is configured to receive data messages from another computer controlled device of the same network using the pre-determined protocol. The message listening module then checks for a match of the message features of the data messages with a pre-determined message interest feature. If there is a match between the message feature and the predetermined message interest feature, the message listening module then forwards the respective data message to the computing module.

The computing device may include one or more selected from the group consisting of a Universal Serial Bus (USB) socket device, a Compact Disc (CD) player, a Digital Versatile Disc (DVD) player, a radio device, a Global Positioning System (GPS) navigation device, a Human Machine Interface (HMI) device, a Heating, Ventilation, and Air Conditioning (HVAC) device, a cell phone device, a voice operated device, and an additional multichannel amplifier.

A producer may purchase a multimedia device like a CD player, a DVD player, or a cell phone device from external suppliers, wherein the multimedia device does not support the MOST protocol. The producer can then include the message queue module in the multimedia device to serve to handle the MOST protocol.

The computing device may also include a Serial Peripheral Interface (SPI) data bus port for communication with other computing device.

The two computing devices may also be provided as an integrated computing device.

In another aspect, a network of computer controlled devices that communicate with each other using a predetermined protocol is provided.

The network includes two or more above computing devices and a dispatcher device. The dispatcher device comprises a dispatcher module. In use, the dispatcher module receives data messages and forwards the received data messages from one computing device to at least one other computing device.

The network provides a data transfer mode and a listening mode.

In the data transfer mode, one computing module sends a data message with a message feature to its corresponding message queue module for sending the message to the dispatcher module using the pre-determined protocol. The dispatcher module then receives the data message and sends the data message to the other computing devices.

In the listening mode, the message listener module receives a data message with a message feature from the dispatcher module using the pre-determined protocol. The message listener module later checks for a match of the feature of the message with the predetermined message interest feature. If a match is detected, the message listener module sends the message with the feature that matches with the predetermined message interest feature to its corresponding computing module.

The computing devices are also configured to communicate with the dispatcher device using Media Oriented Systems Transport (MOST) protocol.

The application also provides an audio and/or visual entertainment system according to the above network, wherein at least two computing devices are provided as audio and/or visual entertainment devices.

Other communication protocols to which the subject matter of the application can be applied comprise the IEEE 1355 standard communication for polymer optical fibre, the Ethernet standard, the CAN (Controller Area Network), LIN (Local Interconnect Network) and other automotive OBD standards.

DETAILED DESCRIPTION OF THE PRESENTLY PREFERRED EMBODIMENTS

In the following description, details are provided to describe embodiments of the application. It shall be apparent to one skilled in the art, however, that the embodiments may be practiced without such details.

Some parts of the embodiments have similar parts. The similar parts may have the same names or the similar part numbers. The description of one similar part also applies by reference to another similar parts, where appropriate, thereby reducing repetition of text without limiting the disclosure.

Figure 1:
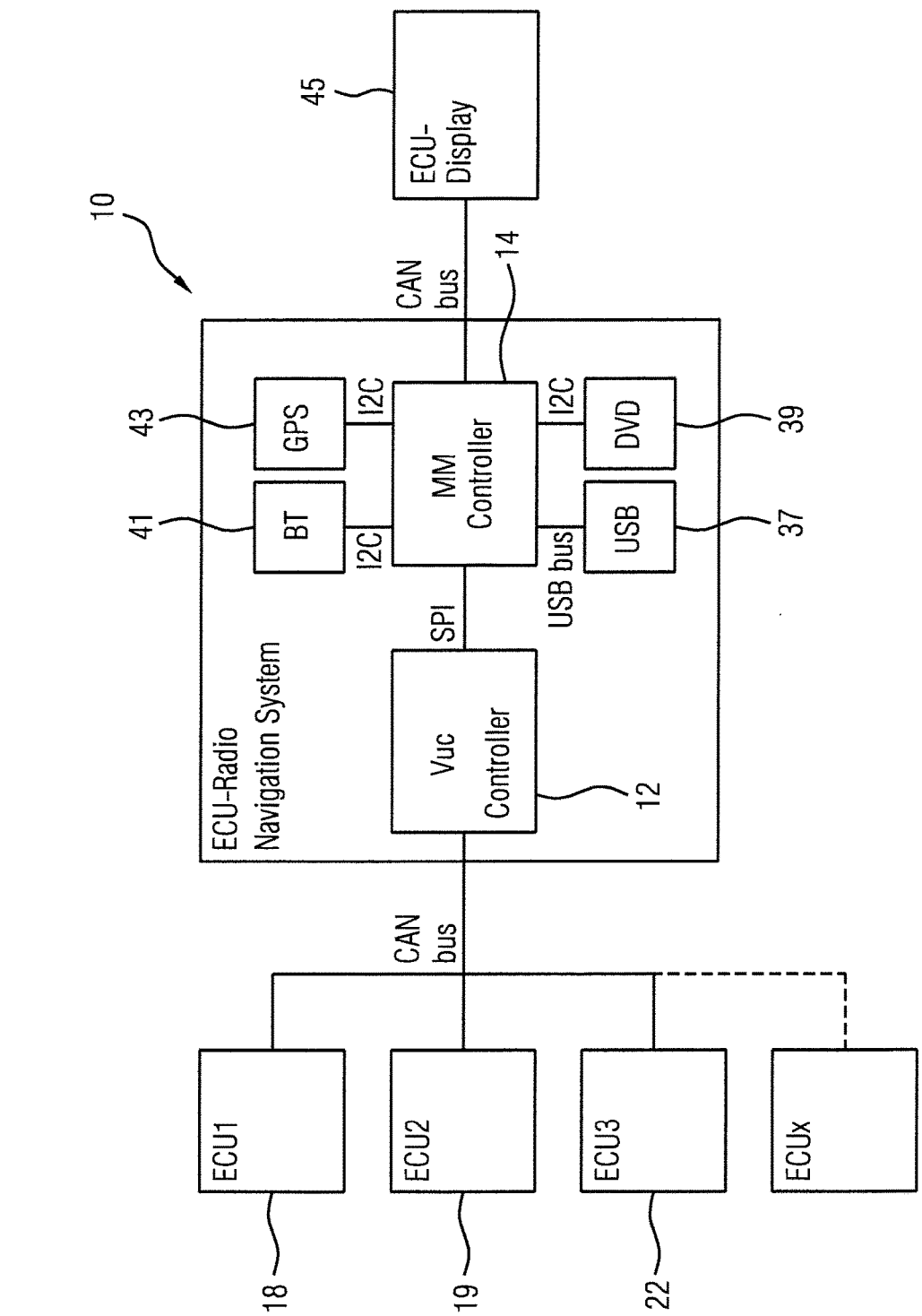
FIG. 1 illustrates an ECU-Radio Navigation System module, wherein the ECU-Radio Navigation System module comprises a multimedia control device with a plurality of multimedia devices and a vehicle control device.

FIG. 1 shows an ECU (Engine Control Module)-Radio Navigation System module 10 for a vehicle. The ECU Radio Navigation System module 10 has two computer microcontrollers, namely a vehicle control device 12 and a multimedia control device 14.

The vehicle control device 12 is connected to a plurality of Engine Control Modules (ECUs) 18, 19, and 22 via a CAN (Controller Area Network) data bus and to the multimedia control device 14 via a SPI (Serial Peripheral Interface) data bus.

The multimedia control device 14 is connected to a plurality of multimedia devices, namely a Universal Serial Bus (USB) device 37, a Digital Versatile Disc (DVD) device 39, a Bluetooth (BT) device 41, and a Global Positioning System (GPS) device 43. The multimedia control device 14 is also connected to an ECU display unit 45.

In particular, the multimedia control device 14 is connected to the USB device 37 via a USB data bus, to the DVD device 39 via an I2C data bus, to the BT device 41 via an I2C data bus, and to the GPS device 43 via an I2C data bus. The multimedia control device 14 is connected to the ECU display unit 45 via the CAN data bus.

In one implementation, the vehicle control device 12 includes a data processor that is produced by Texas Instruments Incorporated. The data processor has an operating frequency of 48 MHz (megahertz) and an OSEK ("Offene Systeme and deren Schnittstellen für die Elektronik in Kraftfahrzeugen"="Open Systems and their Interfaces for the Electronics in Motor Vehicles" in the English language) operating system.

Similarly, the multimedia control device 14 includes, in one implementation a data processor that is produced by Freescale Semiconductor Ltd. The data processor operates at 800 MHz and has a Win EA 7 (Windows Embedded Automotive 7) operating system. The Win EA 7 supports multiple computing processes.

Figure 2:
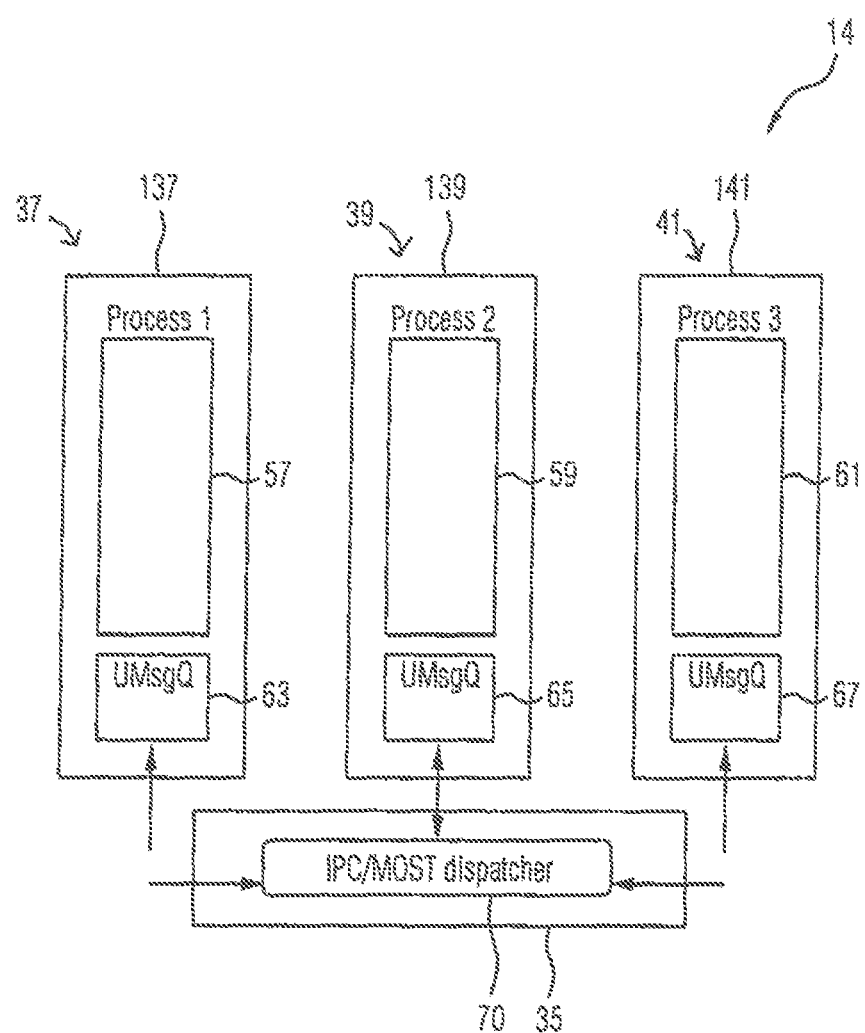
FIG. 2 illustrates an Inter-Process Communication (IPC) among three computing processes and an IPC/Media Oriented Systems Transport (MOST) dispatcher component of the ECU-Radio Navigation System module of FIG. 1.

FIG. 2 shows an Inter-Process Communication (IPC) of the ECU-Radio Navigation System module 10 using a Media Oriented Systems Transport (MOST) protocol. This figure is presented to show software components of a User Message Queue (UMsgQ).

FIG. 2 shows the multimedia devices 37, 39, and 41 have computing processes 137, 139, and 141 with corresponding application modules 57, 59, and 61 and with corresponding User Message Queue (UMsgQ) components 63, 65, and 67, while the multimedia control device 14 has an IPC/MOST dispatcher component 70.

Each User Message Queue UMsgQ component 63, 65, or 67 is bound to its corresponding application module 57, 59, or 61. The UMsgQ components 63, 65, or 67 are communicatively linked to the IPC/MOST dispatcher component 70.

In particular, the computing processes 137, 139, and 141 are software application components, which the Operating System (OS) views as processes. The application modules 57, 59, and 61 are viewed by the OS as process threads or tasks. The User Message Queue UMsgQ components 63, 65, and 67 are software components of an UMsgQ, which the OS views as process threads or tasks. The IPC/MOST dispatcher component 70 is viewed by the OS as a running processing thread or task.

In a general sense, the application modules 57, 59, and 61, the UMsgQ components 63, 65, and 67, and the IPC/MOST dispatcher component 70 are in the form of software running as a process on a controller, a data processor, or a piece of hardware.

In use, each application module 57, 59, or 61 provides its register communication information the IPC/MOST dispatcher component 70. The register communication information allows the IPC/MOST dispatcher component 70 to send messages from other application module 57, 59, or 61 to the application module 57, 59, or 61. In particular, the application module 57, 59, or 61 provides its register communication information to its corresponding UMsgQ component 63, 65, or 67. The corresponding UMsgQ component 63, 65, or 67 later sends the register communication information to the IPC/MOST dispatcher component 70 using the MOST protocol.

Each application module 57, 59, or 61 also provides data to other application module 57, 59, or 61. Specifically, the application module 57, 59, or 61 provides the data to its corresponding UMsgQ component 63, 65, or 67. The corresponding UMsgQ component 63, 65, or 67 afterward receives the data and it later sends a message with the data to the IPC/MOST dispatcher component 70 using the MOST protocol. The IPC/MOST dispatcher component 70 later receives the message and it then automatically sends the message to other UMsgQ components 63, 65, or 67.

Each application module 57, 59, or 61 also registers its message interest with its corresponding UMsgQ component 63, 65, or 67, The message interest relates to a pre-determined type of message that the application module 57, 59, or 61 would like to receive from other application module 57, 59, or 61. Each application module 57, 59, or 61, through its respective UMsgQ component 63, 65, or 67, defines a list of messages that would be broadcast to other external processes. This list is then exported to the external processes to register their interest.

This registration of message interest initiates a listener computing process for the pre-determined message type in the corresponding UMsgQ component 63, 65, or 67. The listener computing process includes an observer computing process with a call-back function. The observer computing process is performed by an observer software programming object in the UMsgQ component 63, 65, or 67.

The observer computing process listens to messages from the IPC/MOST dispatcher component 70, which the IPC/MOST dispatcher component 70 receives from the other application module 57, 59, or 61, to identify messages that meet the message interest of its application module 57, 59, or 61. In other words, the identified messages correspond to the pre-determined message type, which the UMsgQ component 63, 65, or 67 receives from its application module 57, 59, or 61.

When a message that matches with the said interest is detected, the call back function would be invoked automatically to inform the application module 57, 59, or 61 about the message.

Figure 3:
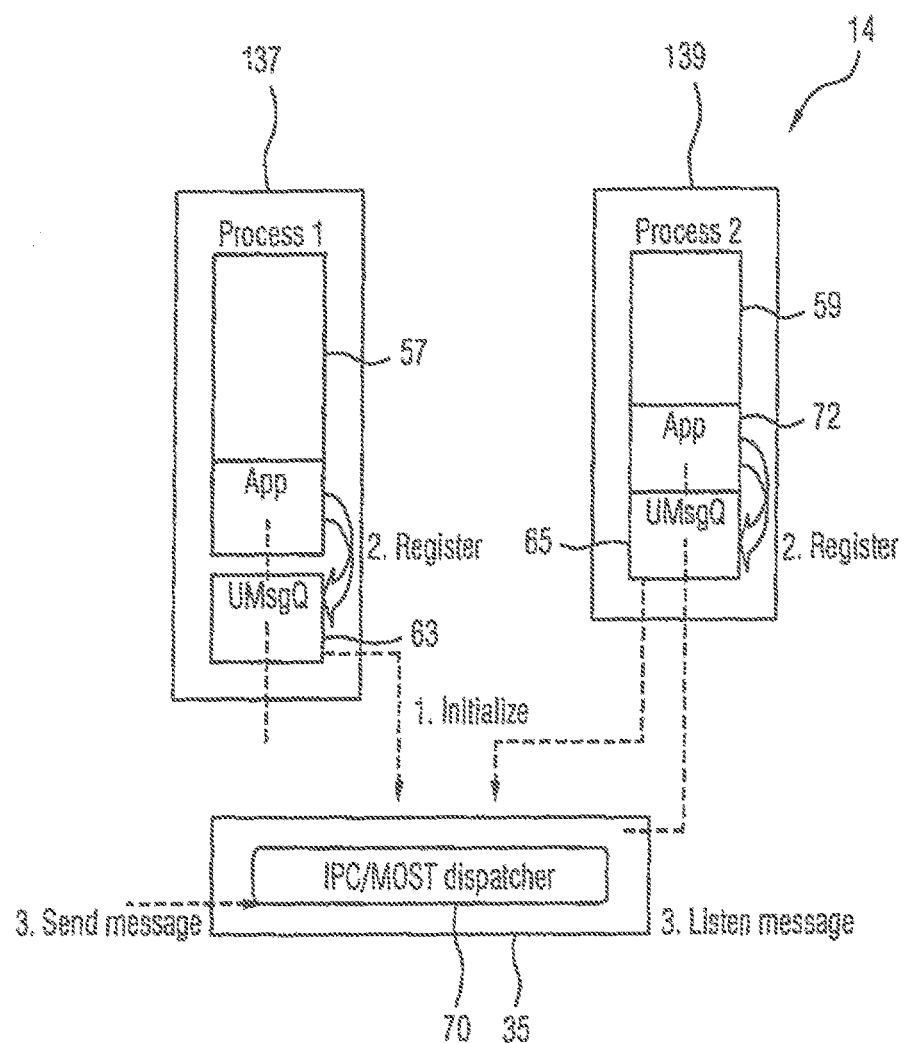
FIG. 3 illustrates a method of one computing process registering and listening to messages from another computing process of the ECU-Radio Navigation System module of FIG. 1.

FIG. 3 shows a method of the application module 59 registering and listening to messages from another application module 57.

The method includes a step of both application modules 57 and 59 performing initialization.

The initialization step includes a step of both application modules 57 and 59 registering their computing process information with the IPC/MOST dispatcher component 70, via their corresponding UMsgQ components 63 and 65. The registration step allows the IPC/MOST dispatcher component 70 to send a message data, which the IPC/MOST dispatcher component 70 received from the other application module 57 or 59, to the other application modules 57 or 59, according to the registered computing process information.

After this, the application module 59 performs a step of registration of message interest. A process thread in a software application program 72 of the application module 59 registers its interest of type of messages, which the application program 72 would like to receive ferom the other application module 57, with its UMsgQ component 65. The UMsgQ component 65 later stores the registered message interest. The UMsgQ component 65 later performs a step of listening for messages from the IPC/MOST dispatcher component 70.

Once the UMsgQ component 65 receives a message with a message type that matches with its stored registered interest, the UMsgQ component 65 then sends the message to the process thread of the application module 59.

In effect, the application module 59 receives the interest message from the other application module 57, via the UMsg component 63, via the IPC/MOST dispatcher component 70, and via the UMsgQ component 65.

Figure 4:
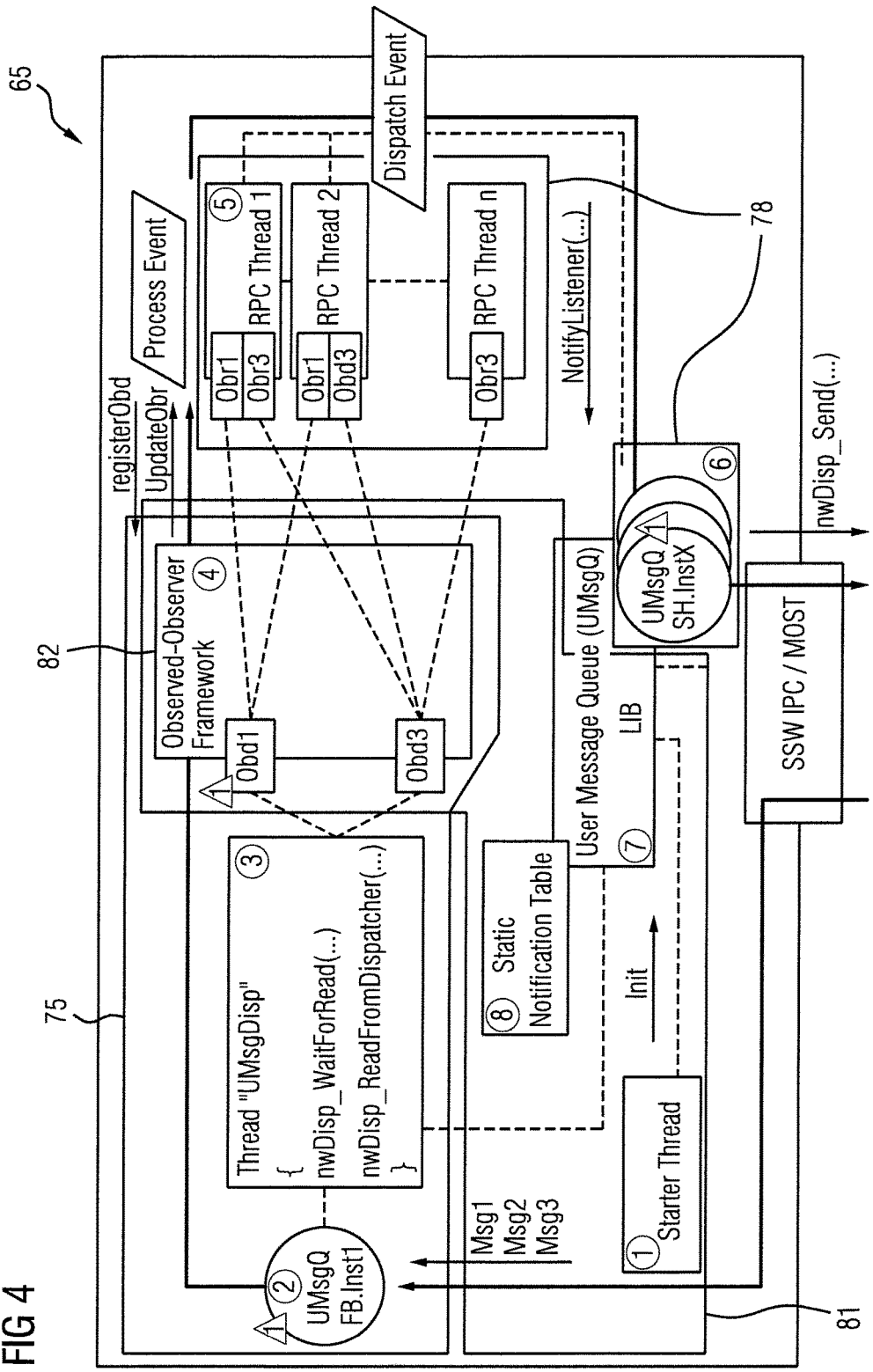
FIG. 4 illustrates sub-components of a User Message Queue UMsgQ component of the computing process of FIG. 3.

FIG. 4 shows sub-components of the User Message Queue UMsgQ component 65, The UMsgQ component 65 comprises three sub-components, namely a receiving and dispatching component 75, a transmitting component 78, and a register component 81.

The receiving and dispatching component 75 (see numbers 2, 3 and 4 in FIG. 4) includes a unique instance of a User Message Queue UMsgQ functional block FBlock for receiving and dispatching messages. The instance refers to a specific realization of an object.

A function block FBlock is a software programming object containing an interface, which specify a method and properties of the function block FBlock, for controlling a specific application, such as a radio tuner, a telephone interface, or a system service. The software programming object refers to a data structure together with an associated processing routine.

The transmitting component 78 (see numbers 5 and 6 in FIG. 4) comprises one or more shadow blocks of the above corresponding UMsgQ functional block FBlock for transmitting messages.

The shadow blocks act as proxies for the function block FBlocks

The register component 81 (see numbers 1, 4, 7, and 8 in FIG. 4) includes an Observed-Observer ObdObr framework 82 for a software programming object to register and to encode or decode messages. In addition, the register component also contains a static notification table and a static message table, which store information about listener message interest. In other words, it stores information regarding messages the listener is interested in.

Figure 5:
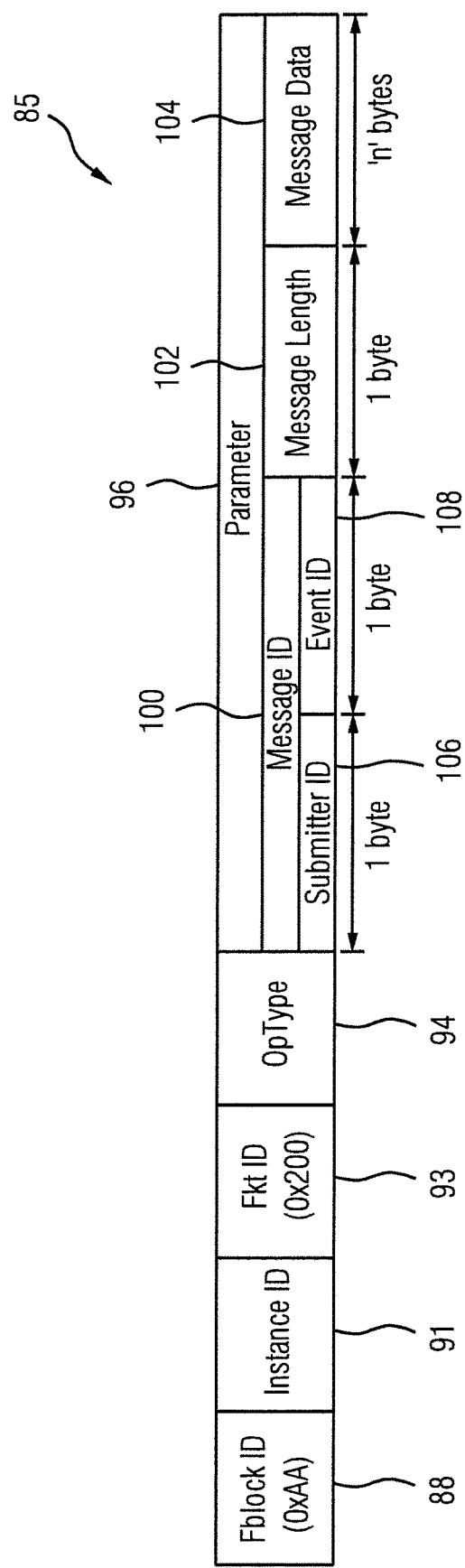
FIG. 5 illustrates a diagram of a message format of the User Message Queue UMsgQ component of FIG. 4.

FIG. 5 shows a diagram of a message format 85 of the User Message Queue UMsgQ component 65. The message format 85 includes a functional block FBlock identity field 88, an instance identifier field 91, a function identifier field 93, an operation type field 94, and a parameter field 96. The parameter field 96 includes a message identifier field 100, a message length field 102, and a message data field 104. The message identifier field 100 includes a submitter identifier field 106 and an event identifier field 108.

Figure 6:
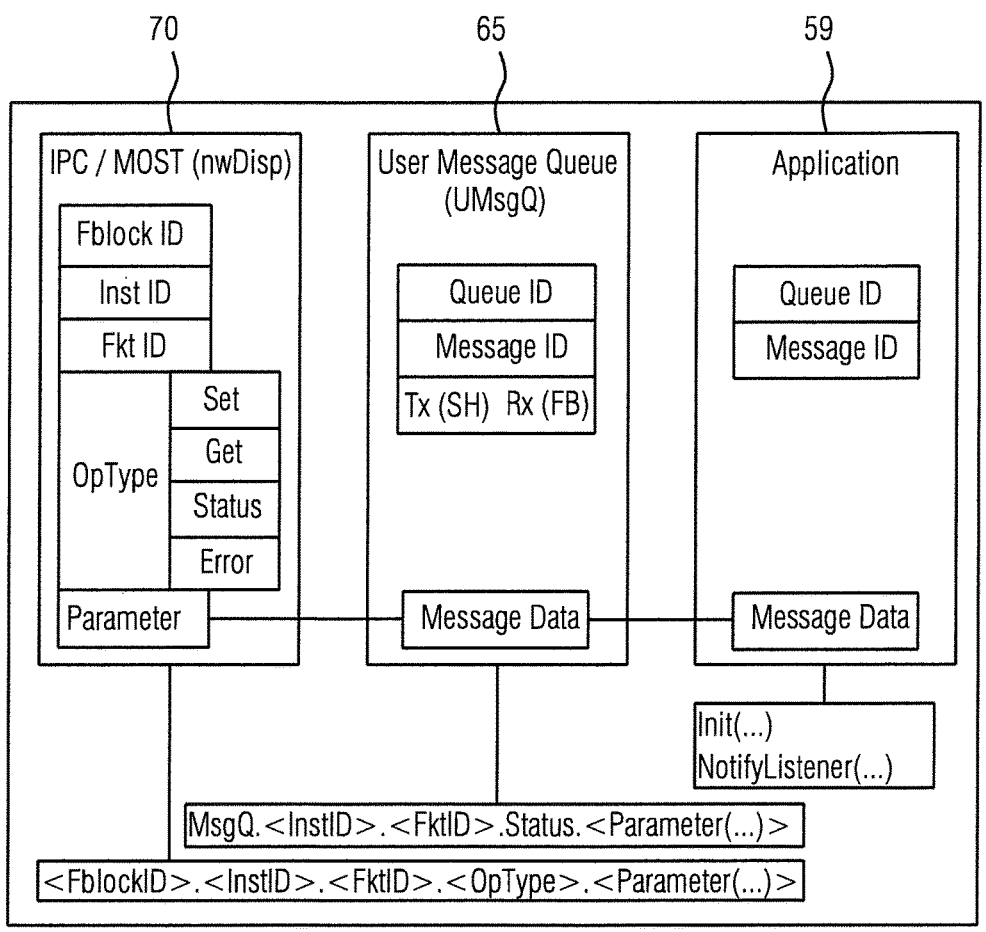
FIG. 6 illustrates a conversion of a message among the IPC/MOST dispatcher, the User Message Queue UMsgQ component, and an application program of the computing process of FIG. 4.

FIG. 6 shows a conversion of a message among the IPC/MOST dispatcher component 70, the User Message Queue UMsgQ component 65, and the application program 72 of the application module 59.

When the User Message Queue UMsgQ component 65 receives a message from its application program 72 for sending to the IPC/MOST dispatcher component 70, the User Message Queue UMsgQ component 65 changes the format of the message to conform to the MOST format. This is done by including additional data Tx (SH)|Rx(FB) in the message.

Similarly, when the User Message Queue UMsgQ component 65 receives a message from the IPC/MOST dispatcher component 70 for sending to its application program 72, the User Message Queue UMsgQ component 65 changes the format of the message from the MOST format to another format that is suitable for its application program 72.

The User Message Queue UMsgQ component 65 changes the format of the message to conform to the MOST format. This is done by including additional data Tx(SH)|Rx(FB) in the message.

Figure 7:
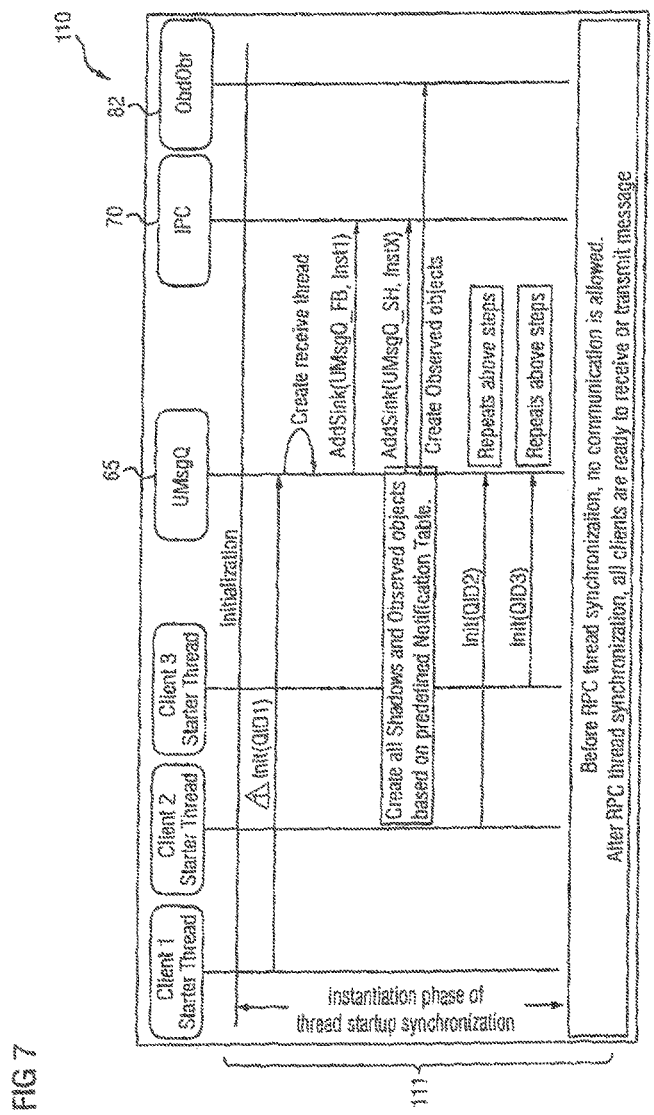
FIG. 7 illustrates a part of a sequence diagram of a method of the ECU-Radio Navigation System module of FIG. 1.
Figure 8:
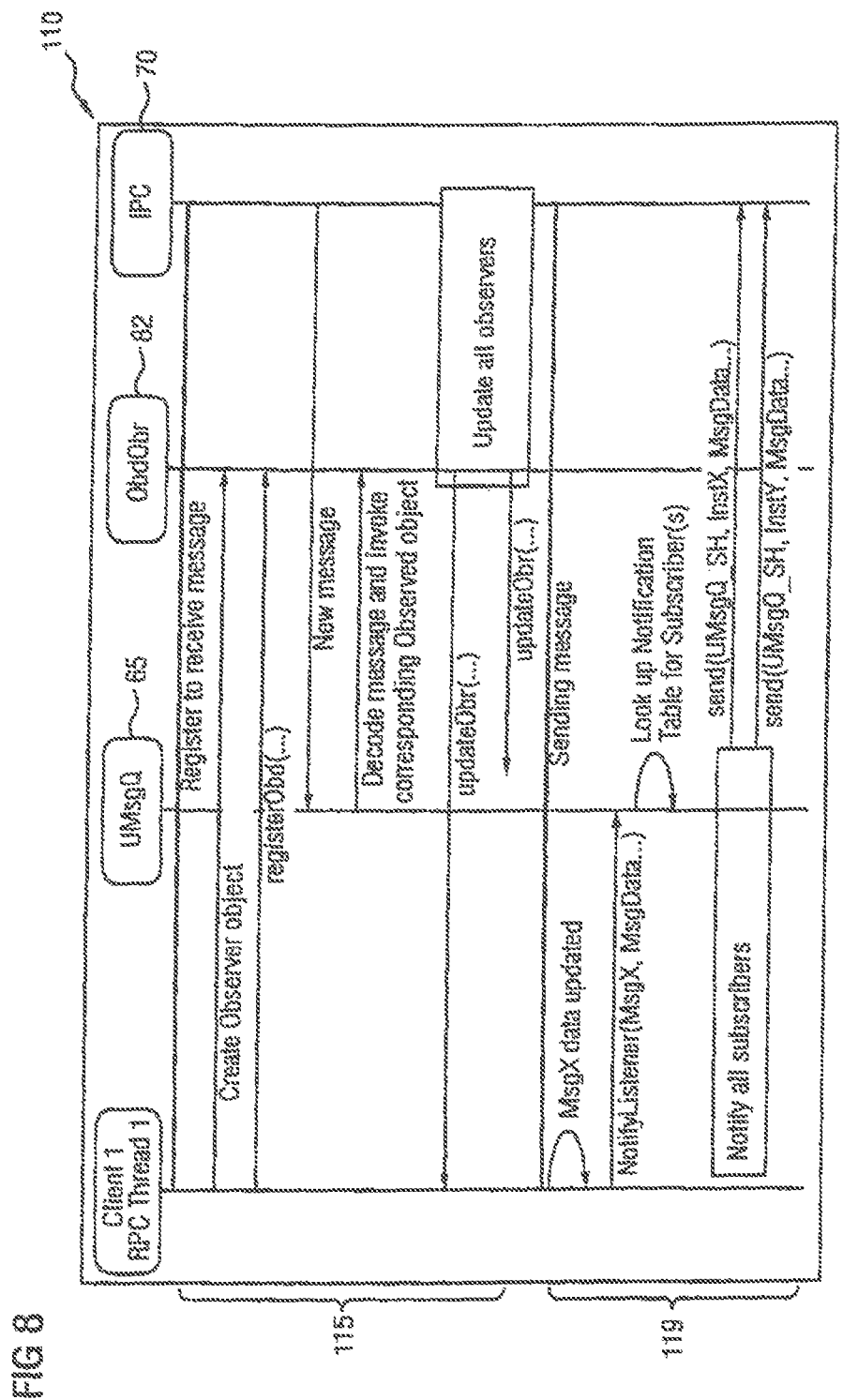
FIG. 8 illustrates another part of the sequence diagram of FIG. 7.

FIGS. 7 and 8 show parts of a sequence diagram 110 that illustrates conversion of a message among the IPC/MOST dispatcher component 70, the User Message Queue UMsgQ component 65 and the application program 72 of the application module 59.

The sequence diagram 110 includes a starting-up phase 111, a message interest receiving phase 115, and sending message phase 119 for the three application modules 57, 59, and 61, which are named here as a client 1, a client 2 and a client 3. The receiving phase 115 is performed after the starting-up phase 111 while the sending message phase 119 in performed after the receiving phase 115.

In the start-up phase 111, a receive process thread was created in an UMsgQ component. The receive process thread is also called a received process thread. This receive process thread is used for processing a received message. Next, the related functional block FBlock and all shadow blocks of the UMsgQ component are registered with the IPC/MOST dispatcher component 70. Do note that each UMsgQ component has only one unique functional block FBlock but can have many shadow blocks of the functional block FBlock.

In the message interest receiving phase 115, observed software programming objects and observer software programming objects of the UMsgQ component are also registered with an Observed-observer ObdObr framework 82 of the IPC/MOST dispatcher component 70.

In the sending message phase 119, messages can be sent or received among the application modules 57, 55, and 62 or among the clients 1, 2, and 3.

In practice, it is possible to have many computing processes running in one computer network, wherein the computing processes communicate with each other.

Figure 9:
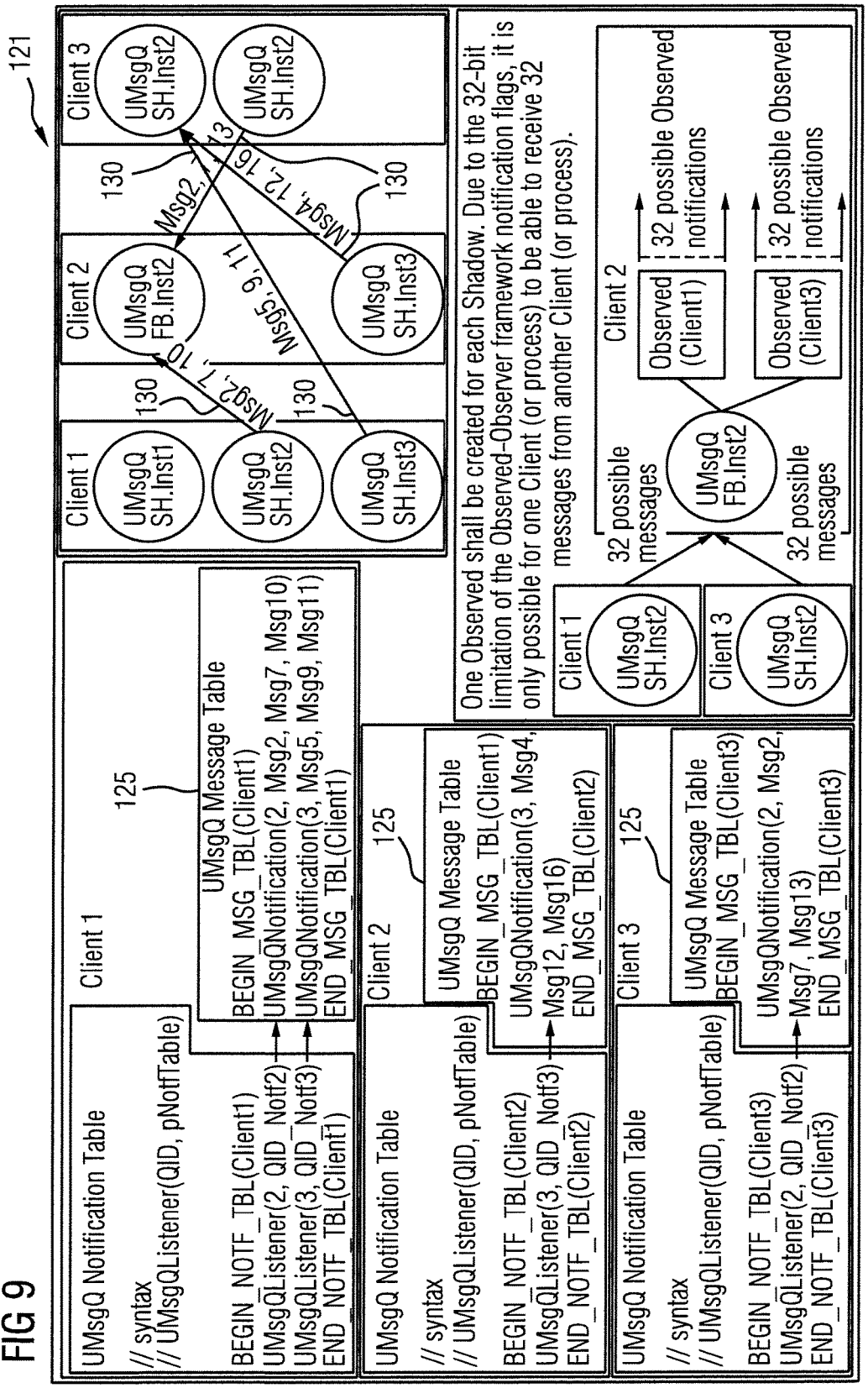
FIG. 9 illustrates an application of the ECU-Radio Navigation System module of FIG. 1.

FIG. 9 shows an application 121 of the multimedia control device 14 and the vehicle control device 12.

The application 121 includes tables 125 of the respective computing process that stores statically a registration of an interest of types of UMsgQ messages.

The application 121 also includes communications 130 among three application modules 57, 59, and 61. The client 1 only sends messages to the client 2 and to the client 3. The client 2 listens to messages from both the client 1 and the client 3. At the same time, the client 2 also sends messages to the client 3. Similarly, the client 3 listens to messages from both the client 1 and the client 2. At the same time, the client 3 also sends messages to the client 2.

The client 1, 2, or 3 can act as the multimedia control device 14 while another client 1, 2, or 3 can act as the vehicle control device 12.

Figure 10:
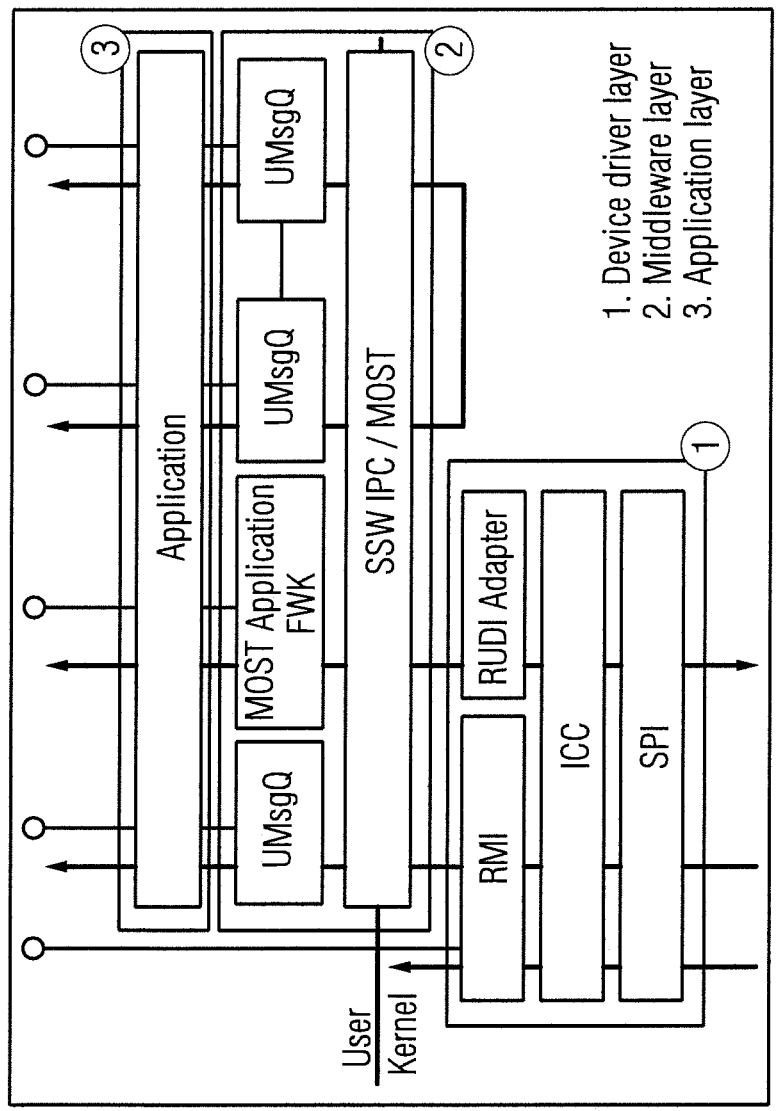
FIG. 10 illustrates an overall application of the ECU-Radio Navigation System module of FIG. 1.

FIG. 10 shows an overall application of the ECU-Radio Navigation System module 10 of FIG. 1.

The UMsgQ component acts as an intermediate component for connection between an application of the computing process and a middleware software program. The middleware software program enables two separate programs to communicate and interact with each other.

In one implementation, the maximum size of message of the UMsgQ component is 255 bytes. The maximum count of listeners for one certain message is 32. The maximum number of computing processes that the UMsgQ component can support is 31.

Figure 11:
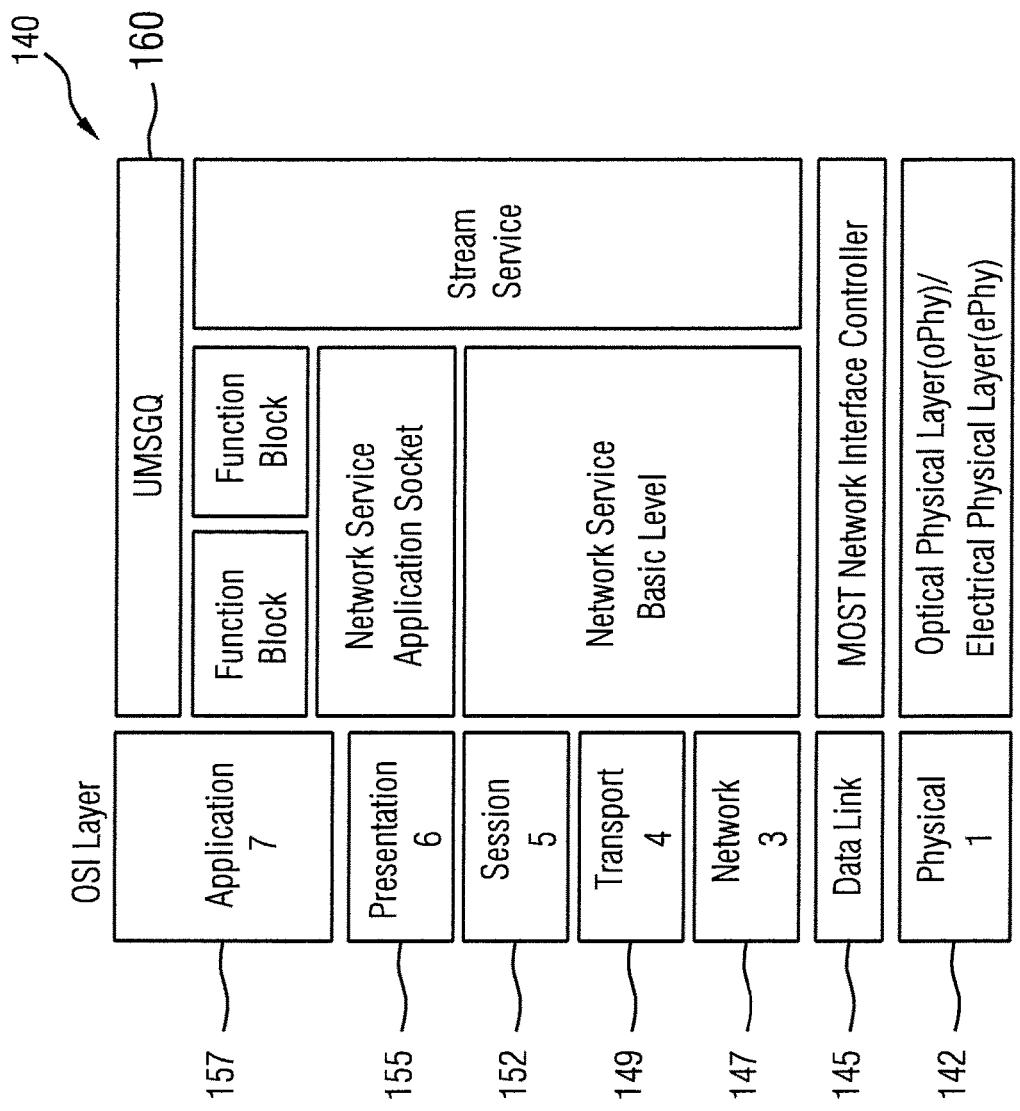
FIG. 11 illustrates ISO-OSI model of network protocol that is used the ECU-Radio Navigation System module of FIG. 1.

FIG. 11 shows an International Standard Organization's Open System Interconnect (ISO-OSI) model 140 of network protocol, which is used by the EC-Radio Navigation System module 10. The ISO-OSI model has seven network layers, 142, 145, 147, 149, 152, 155, and 157

In particular, the first layer 142 refers to physical features of the network protocol. The second layer 145 refers to data link features of the network protocol. The third layer 147 refers to network features of the network protocol. The fourth layer 149 refers to data transport features of the network protocol. The fifth layer 152 refers to session protocol of the network protocol. The sixth layer 155 refers to external data representation of the network protocol. The seventh layer 157 refers to application software of the network protocol, which also includes an UMsgQ component 160.

Figure 12:
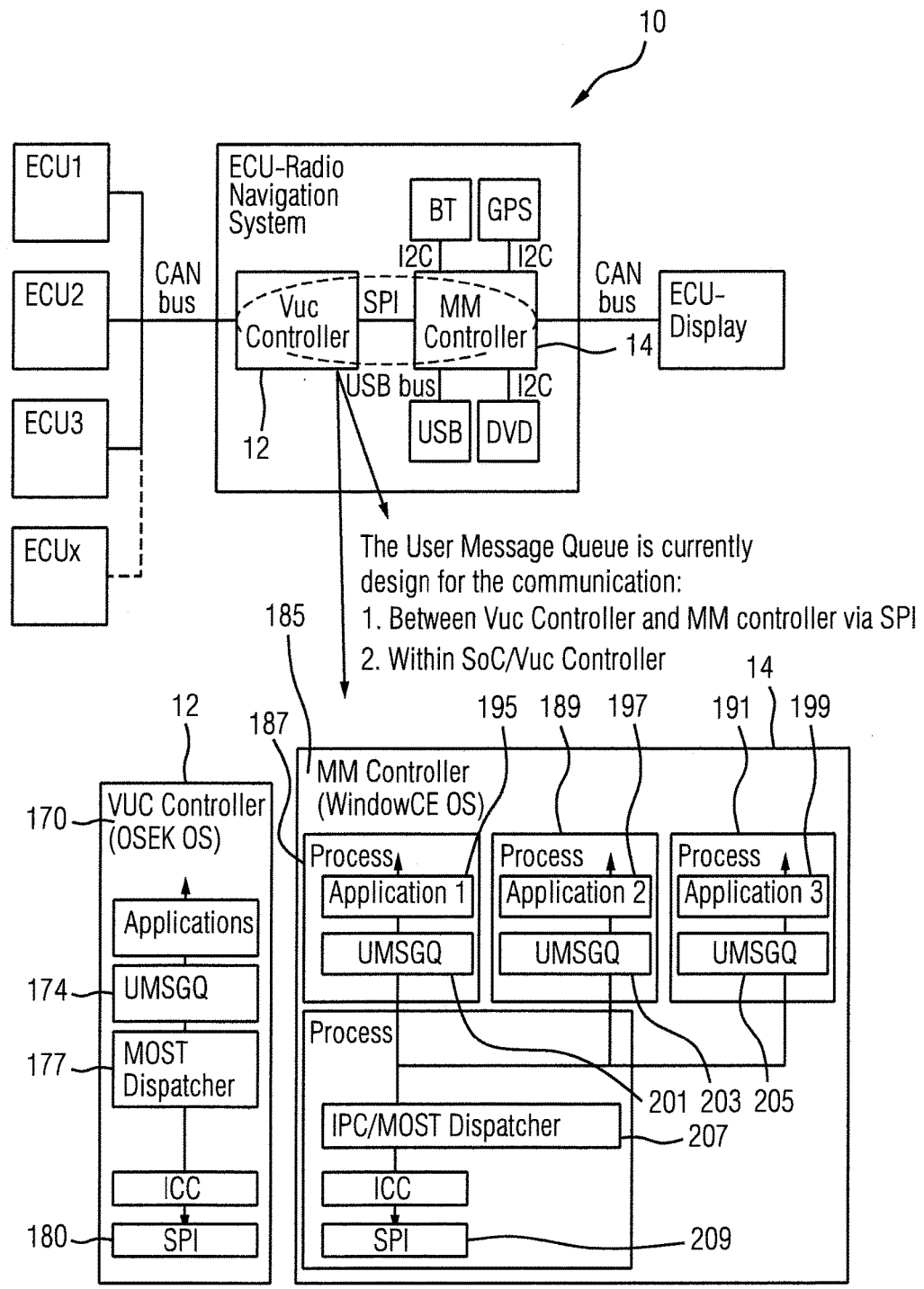
FIG. 12 illustrates communication between the multimedia control device and the vehicle control device of the ECU-Radio Navigation System module of FIG. 1.

FIG. 12 shows a communication process between the multimedia control device 14 and the vehicle control device 12.

In one implementation of the multimedia control device 14 and the vehicle control device 12, the multimedia control device 14 and the vehicle control device 12 are linked by a SPI data bus.

The vehicle control device 12 has an OSEK operating system 170. Within the OSEK operating system 170, it has application programs 172 that are linked to an UMsgQ component 174, which is linked to a MOST dispatcher 177. The MOST dispatcher 177 is linked to a SPI data port 180.

The multimedia control device 14 has a Window CE operating system 185. The Window CE operating system 185 has three application processes 187, 189, and 191 and a dispatcher process 193.

The application processes 187, 189, and 191 have application programs 195, 197, and 199 respectively. The application programs 195, 197, and 199 are linked to corresponding UMsgQ components 201, 203, and 205. These UMsgQ components 201, 203, and 205 are linked to an IPC/MOST dispatcher 207 of the dispatcher process. The IPC/MOST dispatcher 207 is linked to an SPI data port 209.

The two SPI data ports 180 and 209 are communicatively connected together.

In general, the UMsgQ component provides a simple and easy way for one computing process to send messages to another computing process. The computing process avoids communicating directly with the other computing processes, which requires use of MOST protocol, which is complex. The computing process merely needs to communicate with its user message queue UMsgQ component, which is simple and easy, while the user message queue UMsgQ component handles the complex MOST protocol communication with the IPC/MOST dispatcher component.

A developer of an application program of the computing process does not need to understand the MOST protocol. In particular, the developer does not need to define and to control many details of the framework, of the MOST protocol, such as creating as well as configuring function blocks FBlock and shadow blocks of the functions blocks FBlock.

The source code of the application program is also often larger and more complex that the source code of the UMsgQ component. Hence, it is easier to adapt the source code of the UMsgQ component than to adapt the source of the application program to handle the MOST protocol communication. Moreover, the computing process often has more than one application program.

The MOST protocol is usually revised from time to time to include new features for meeting new user demands. When this occurs, just the UMsgQ component can then be adapted to accommodate for this MOST protocol revision while the usually larger application program is left unchanged.

In short, the use of the UMsgQ component provides an efficient way of the sharing of messages among the computing processes. This is especially beneficial for system that uses the MOST system, which has a complex protocol.

In a general sense, the UMsgQ component can be used to facilitate communication among different process threads of same computing process of same data processor. The UMsgQ component can be also be used to facilitate communication among different computing processes of same data processor.

The required number of User Message Queue UMsgQ component used is not dependent on the number of data processor present. It is dependent on the number of computing processes used and on the Operating System (OS). As an example, the Microsoft Window OS supports multiple computing processes and multiple process threads.

The MOST protocol can be implemented internally within a computer device with multiple computing processes, wherein the communication between these processes can be done via the MOST protocol.

The embodiments can also be described with the following list of features being organized into an item list. The respective combinations of features which are disclosed in the item list are regarded as independent subject matter, respectively, that can also be combined with other features of the application.

First Item: A method for running a communication network of computer controlled devices that communicate with each other using a pre-determined protocol, the method comprising the following steps:
  generating a data message with a pre-determined message feature in a first computing module of a first computing device,
  sending the data message to a dispatcher device receiving the data message in the dispatcher device and forwarding it to at least one second computing device,
  receiving the data message in the at least one second computing device and checking for a match of the message features of the data message with a predetermined message interest feature, and if there is a match between the message feature and the pre-determined message interest feature, automatically invoking a pre-determined call-back function in the second computing module to forward the respective data message to a second computing module of the at least one second computing device.

Second Item: A method for running a communication network of computer controlled devices that communicate with each other using a pre-determined protocol, the method comprising the following steps:
  generating a data message with a pre-determined message feature in a first computing module of a first computing device,
    sending the data message to a dispatcher device,
    receiving the data message in the dispatcher device and forwarding it to at least one second computing device, receiving the data message in the at least one second computing device and checking for a match of the message features of the data message with a predetermined message interest feature, and if there is a match between the message feature and the pre-determined message interest feature, forwarding the respective data message to a second computing module of the at least one second computing device,
wherein the generating of a data message with a predetermined message and the sending of the data message to the dispatcher device further comprises a step of converting the data message from a pre-determined application format to a pre-determined network protocol format.

Third Item: A method for running a communication network of computer controlled devices that communicate with each other using a pre-determined protocol, comprising the following steps: generating a data message with a pre-determined message feature in a first computing module of a first computing device,
  sending the data message to a dispatcher device, receiving the data message in the dispatcher device and forwarding it to at least one second computing device, receiving the data message in the at least one second computing device and checking for a match of the message features of the data message with a predetermined message interest feature, and if there is a match between the message feature and the predetermined message interest feature, forwarding the respective data message to a second computing module of the at least one second computing device,
  wherein the forwarding the respective data message to a second computing module of the at least one second computing device comprises a step of converting the data message from a predetermined network protocol format to a pre-determined application format.

Fourth Item: The method for running a communication network of computer controlled devices that communicate with each other using a pre-determined protocol according to one of the aforementioned items, wherein
  the pre-determined protocol is a MOST protocol.

Fifth Item: The method for running a communication network of computer controlled devices that communicate with each other using a pre-determined protocol according to one of the aforementioned items, the method further comprising
  the first and second computing devices registering their address information with the dispatcher device.

Sixth Item: The method for running a communication network of computer controlled devices that communicate with each other using a pre-determined protocol according to one of the aforementioned items further comprising
  a software application program of the at least one second computing device registering its pre-determined message interest feature with the respective second computing device.

Seventh Item: A computing device for a network of computer controlled devices that communicate with each other using a predetermined protocol, the computing device comprising
  a computing module for sending a data message with a predetermined message feature and a message queue module that comprises
  a message forwarding module for receiving data messages from its computing module and for forwarding the data messages to another computer controlled device of the same network, and a message listening module for receiving data messages from another computer controlled device of the same network, for checking for a match of the message features of the data messages with a predetermined message interest feature, and if there is a match between the message feature and the predetermined message interest feature, for forwarding the respective data message to the computing module.

Eighth Item: The computing device according to the seventh item further comprising one or more of a group of a Universal Serial Bus (USE) socket device, a Compact Disc (CD) player, a Digital Versatile Disc (DVD) player, a radio device, a navigation device, a Human Machine Interface (HMI) device, a Heating, Ventilation, and Air Conditioning (HVAC) device, a cell phone device, a voice operated device, and an additional multichannel amplifier.

Ninth Item: The computing device according to the seventh or eighth item further comprising a Serial Peripheral Interface (SPI) data bus port.

Tenth Item: The computing device according to one of the seventh through ninth items, wherein
  the two computing devices are provided as an integrated computing device.

Eleventh Item: A network of computer controlled devices that communicate with each other using a pre-determined protocol, the network comprising
  at least two computing devices according to one of the seventh to ninth items, and
  a dispatcher device comprising a dispatcher module for receiving data messages and for forwarding the data messages from one computing device to at least one other computing device.

Twelfth Item: The network of computer-controller devices according to the eleventh item, wherein the at least two computing devices communicate with the dispatcher device using Media Oriented Systems Transport (MOST) protocol.

Thirteenth Item: An audio and/or visual entertainment system according to the eleventh or twelfth item, wherein at least two computing devices are provided as audio and/or visual entertainment devices.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for running a communication network of computer controlled devices that communicate with each other using a pre-determined protocol, the method comprising:

generating a data message with a pre-determined message feature in a first computing module of a first computing device;

sending the data message to a dispatcher device;

receiving the data message in the dispatcher device and forwarding it to at least one second computing device;

receiving the data message in a second computing module of the at least one second computing device and checking for a match of message features of the data message with a predetermined message interest feature; and if there is a match between at least one of the message features and the pre-determined message interest feature, automatically invoking a pre-determined callback function in the second computing module to forward the respective data message to a second computing module of the at least one second computing device, wherein the pre-determined protocol used by the computer-controlled devices is a Media Oriented Systems Transport (MOST) protocol and each of the first and second computing modules has a software component configured to communicatively link with the dispatcher device, which dispatcher device converts a non-MOST protocol of the first and second computing modules to the MOST protocol, wherein the messages control one or more of a plurality of multimedia devices, and wherein the non-MOST protocol is an Inter-Process Communication (IPC) protocol.

2. The method according to claim 1, further comprising:

the first and second computing devices registering their address information with the dispatcher device.

3. The method according to claim 1, further comprising:

a software application program of the at least one second computing device registering its pre-determined message interest feature with the respective second computing device.

* * * * *